United States Patent Office 3,229,357
Patented Jan. 18, 1966

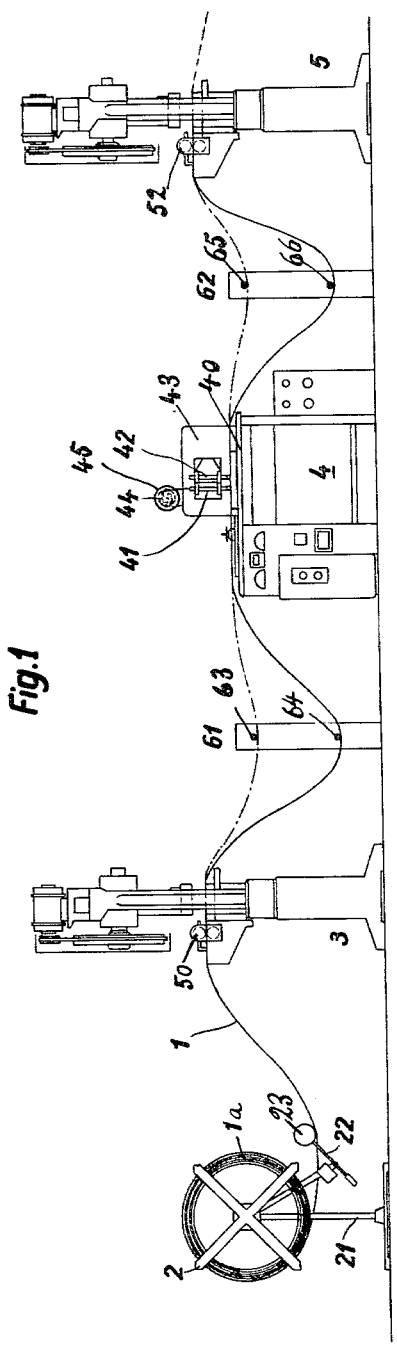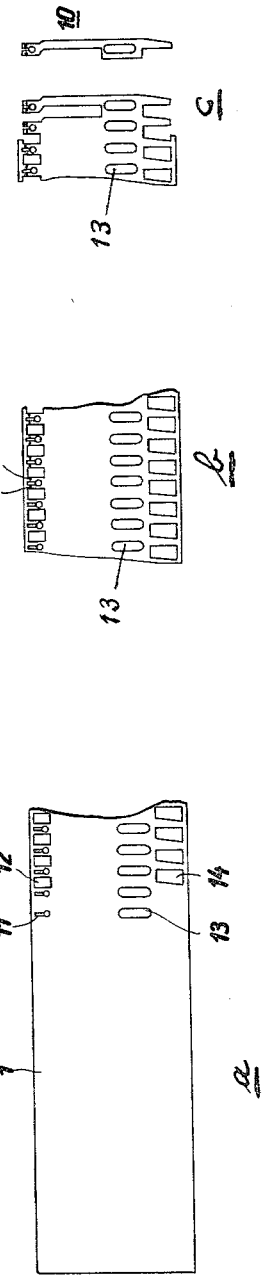

3,229,357
PROCESS AND APPARATUS FOR MANUFACTURING CONTACT BLADES
Marcel Burstin, Zurich, Switzerland, assignor to H. A. Schlatter A.G., Zurich, Switzerland
Filed July 3, 1962, Ser. No. 207,299
Claims priority, application Switzerland, July 5, 1961, 7,852/61
2 Claims. (Cl. 29—155.55)

The present invention relates to a process and apparatus for making contact blades having at least one contact point which is welded to the contact blade and more particularly to a process and apparatus in which a continuous sheet of spring metal is successively worked in separate cutting and welding machines until a contact blade having the desired form and quantity of contact points is produced.

According to this process the contact points are welded to a continuous sheet of spring metal, preferably brass, nickel, silver or bronze, and thereafter strips of the sheet metal, constituting the contact blades, are severed from the sheet of spring steel together with the contact points welded thereto.

The process according to the invention is particularly characterized in the fact that the parts of the continuous metal sheet which correspond in each instance to one contact blade, are partly formed before the contact points are welded to the strip of spring steel which ultimately forms the completed contact blade, and that during the welding of the contact points and during the cutting or severing of the parts corresponding in each case to one contact blade the worked parts of the continuous metallic sheet are located in a predetermined position relative to the welding head and the cutting or severing tools.

The arrangement for carrying out this process comprises a support for a wound coil of the metal sheet material to be worked, a device for welding the contact points to the continuously worked metal sheet, and a device for cutting or severing the parts to which the contact points have been applied and which ultimately constitute the contact blades produced from the metal sheet.

The apparatus according to the invention includes also a device for the partial shaping or cutting of each contact blade located closest to the metal sheet or strip, being drawn from the coil and representing a first work station or process phase and also members which due to their specific shape or configuration are at least partly adapted to shaped pilot or guide holes or apertures cut into the metal sheet in the first work area and which are designed to be inserted into these apertures for the purpose of holding the continuous metal sheet during the welding and cutting operation in a predetermined position of the shaped holes relative to the welding and cutting devices.

It is therefore an object of this invention to provide a process and apparatus which make it possible to manufacture in a simple manner contact blades having small tolerances wherein the welding of the contact points as well as the severing of the contact blades from the metal sheet is carried out in a predetermined position and in an expeditious and dependable manner.

Other objects and advantages of the invention will become apparent from the following description taken in combination with the attached drawing which illustrates an embodiment of the apparatus comprising successive stations for working the metal sheet. The process of the invention is explained in reference to this novel apparatus. In the drawing:

FIG. 1 is a diagrammatic side elevation of an apparatus according to the present invention for manufacturing contact spring blades from a sheet of spring metal and provided with two welded contact points.

FIG. 2 shows a partial plan view of three sections $a$, $b$, and $c$ of the metal sheet corresponding to the three different work stations according to FIG. 1.

Figure 3:
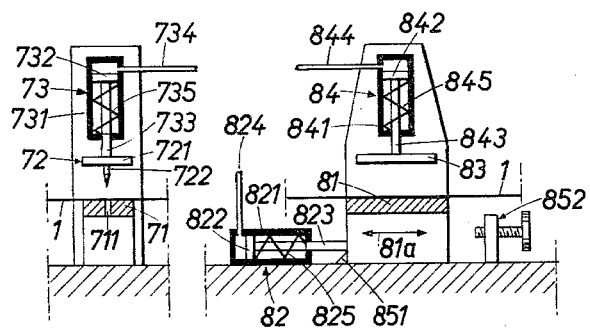
FIG. 3 is a diagrammatic side elevation, partly in section, of means included in the apparatus according to FIG. 1 and adapted to advance the sheet of spring metal step by step through devices of this apparatus and to adjust and secure the sheet in a predetermined position during processing.

Referring now particularly to FIG. 1 of the drawing, the sheet 1 of spring metal is supplied from a coil 1a which is wound on a drum 2 mounted rotatably on a support frame 21. A sensing control device 22 is fixed to an arm 21a of frame 21 and has a sensing head 23 which is held in contact with the metal sheet 1. The metal sheet passes under the sensing head 23 and into a punching press 3 where the first shaping or cutting operation is effected. The sheet passes subsequently through a machine for preparing and welding the contact points to the metal sheet at spaced predetermined locations and is moved finally into a second punching press 5 where the last cutting strokes are carried out. Between machine 4 and the punching presses 3 and 5, control means 61 and 62 are provided which will be described in greater detail hereafter.

In punching press 3 the holes or perforations 11, 12, 13 and 14 (FIG. 2) are punched or cut into the metal sheet. Each of the perforations 13 constitutes a hole of predetermined shape which forms part of contact spring blades 10 to be manufactured. A portion of the edge of openings 11, 12 and 14 forms a part of the edge of the completed contact springs being produced.

In machine 4 a continuously fed wire of a contact material, such as silver, platinum, palladium, gold, or a suitable alloy, is welded to the metal sheet at predetermined locations, is thereafter severed, leaving sufficient contact material to provide an effective contact point and subsequently the severed piece of wire welded to the sheet is given a desired shape by stamping. Any suitable process or apparatus for producing this welding and severing operation may be employed, such as the method disclosed in U.S. Patent 1,744,810—Shallcross, or any other appropriate known prior art apparatus.

The machine 4 has a welding head 41 mounted on a support plate 43 and extending over a table 40 of the machine. The head 41 is provided with a conventional wire tensioning device (not shown). The wire of suitable contact material is wound off a coil 44 mounted on a rotatable drum 45. A stamping head 42 is also mounted on support plate 43 of machine 4 and extends over the stamping table adjacent welding head 41. The contact points designated by numerals 15 and 16 in FIG. 2, section $b$, must be welded down at predetermined locations of the contact blade 10 and with a small tolerance therebetween. In order to assure this exact locating of the contact points, the continuous metal sheet is secured in machine 4 during the welding operation by means of suitable guide elements which are at least partly adapted in form or configuration to one or more of the holes 11, 12, 13, or 14 which may serve as guide or pilot holes which are punched or cut into the metal sheet in the press 3 located ahead of machine 4. The guide members are inserted into these holes and engage the metal sheet whereby they maintain it in the predetermined position of the holes 11, 12, 13 and 14 relative to the welding head 41 during the welding operation. These guide members and their operation are described later with reference to FIG. 3. The stamping head 42 is mounted at such a distance from the welding head 41 that during simultaneous actuation with the welding head 41 it strikes upon the welded piece of contact wire previously welded to the metal sheet. It is understood that several welding heads and in a corresponding manner several stamping heads may be provided in such an apparatus instead of just one welding and stamping head, as illustrated and described herein, so that a pair of contact points 15, 16 are simultaneously welded and thereafter simultaneously stamped into a desired shape. Similarly, it is possible to apply and weld contact elements which have been preformed, so that the stamping operation may be eliminated.

The second punching press 5 performs two punching or cutting operations at the same time, the first punching action enlarging the holes 12 and 14 by severing the edge and cutting hole 12 farther inwardly to the extent illustrated in FIG. 2, section c, at the end of the metal sheet 1 while the second punching action cuts through the connecting web portion between adjacent holes 13 at the end of the continuous metal sheet or strip, thus severing the completed contact blade 10 from the end of the sheet. During these punching operations the metal sheet is maintained in position in the same manner as during the welding and punching process described above wherein other like guide members associated with the punching press 5 are inserted into one or more of the openings 11, 12, 13 and 14, the metal sheets or strips being thus maintained securely in their position relative to the stamping or cutting tools so that the cuts which are effected in this punching press 5 meet exactly in the predetermined manner with the edge of the openings 12 and 14.

Referring now particularly to FIG. 3, the metal sheet 1 slides on a stationary first base 71 having a hole 711 corresponding in form or configuration to one or more of the holes 11, 12, 13, 14 (see FIG. 2a). A securing element, generally indicated by 72, including a plate 721 and a guide element or pin 722 is arranged above the base 71. The cross section of the pin 722 corresponds to the cross section of the hole 711 and the lower end of the pin is tapered. The securing element 72 can be reciprocated vertically by means of a pneumatic or hydraulic motor, generally indicated by 73 and having a stationary cylinder 731 and a piston 732 connected by means of a piston rod 733 with the securing element 72. The piston 732 can be urged by fluid pressure, supplied through conduit 734, downwardly against the elastic force of a spring 735 in such a manner that the pin 722 goes through the corresponding of the holes of the sheet 1 into the hole 711 of base 71, thereby adjusting the sheet 1 in a predetermined position whereupon the sheet is pressed by means of the plate 721 against the base 71.

The metal sheet 1 slides also on a movable second base 81 which can be reciprocated by means of a pneumatic or hydraulic motor, generally indicated by 82, in the direction of advancement of sheet 1 as indicated by double arrow 81a. The pneumatic or hydraulic motor 82 includes a stationary cylinder 821 and a piston 822 connected by means of a piston rod 823 with the base 81. The piston 822 can be urged by fluid pressure supplied through conduit 824 against the elastic force of a spring 825 in the direction of advancement of sheet 1. A clamping jaw 83 is arranged above the base 81. This clamping jaw 83 can be reciprocated vertically by means of a pneumatic or hydraulic motor, generally indicated by 84. The hydraulic motor 84 includes a cylinder 841 connected with base 81 and a piston 842 connected through a piston rod 843 with the clamping jaw 83. The piston 842 can be urged downwardly against the elastic force of a spring 845 by means of fluid pressure supplied through conduit 844, thereby securing sheet 1 by clamping it between the base 81 and the clamping jaw 83. The movement of the base 81 together with clamping jaw 83 and pneumatic or hydraulic motor 84 associated therewith is limited by a stationary abutment member 851 and adjustable abutment means generally indicated by 852. In FIG. 3, base 81 is shown as abutting abutment member 851.

Each of the conduits 734, 824, and 844 can be connected by controllable valve means with fluid pressure supply means or with a discharge pipe respectively as required for individual reciprocating of each pistons 732, 822, and 842. Said controllable valve means, said fluid pressure supply means and said discharge pipe are not shown in the drawing are not described in detail because they are well known in the art.

One arrangement as shown in FIG. 3 and described above is included in the machine 4 for preparing, welding, and stamping of the contact points, and one further arrangement similar in construction is included in the second punching press 5. Said controllable valve means are controlled by or in connection with the machine 4 or punching press 5 respectively. Preferably, the stationary base 71 and the parts associated therewith are arranged on the sheet inlet side and the movable base 81 with parts associated therewith is arranged on the sheet outlet side of machine 4 or punching press 5 respectively.

The operation of each of these arrangements as shown in FIG. 3 and associated with the machine 4 and the punching press 5 respectively is a follows: Firstly, no fluid pressure is applied to pneumatic or hydraulic motors 73, 82, 84. The sheet 1 is punched in punching press 3 and advanced to the machine 4. Now, the sheet is one time manually preadjusted on base 71 in such a manner that one of the holes 11, 12, 13, 14, corresponding to hole 711, lies at least partly on hole 711. Then, piston 732 is urged downwardly. Thereby the adjustment of sheet 1 is completed by means of pin 722 so that said hole in sheet 1 coincides exactly with hole 711, and the sheet 1 is clamped between base 71 and plate 721. All further operations are then automatically controlled as follows: Piston 842 is urged downwardly. The machine 4 or punching press 5 respectively with which the arrangement is associated carries out one operation (welding and stamping or punching respectively). Thereafter, cylinder 731 is discharged from fluid pressure, spring 735 moves piston 732 with pin 722 and plate 721 upwardly, piston 822 is urged thereby advancing the base 81 with jaw 83 and the sheet 1 clamped therebetween a distance which corresponds to the distance of the holes in sheet 1 in which a pin is to be inserted for adjustment. Thereafter, fluid pressure in cylinder 841 is discharged so that jaw 83 is lifted by spring 845, and piston 732 is at once urged downwardly, piston 842 is urged downwardly, whereupon the machine 4 or punching press 5 respectively carries out the next operation (welding and stamping or punching respectively) and the cycle is repeated.

It is to be noted that the stroke of piston 822 has to be adjusted by adjustable abutment means 852 so that after each advancing step of sheet 1 the point of pin 722 coincides with one of the holes of sheet 1. For this purpose, the stroke of piston 822 must correspond in length sufficiently exact to the distance of the holes of sheet 1 following each other in the direction of advancement thereof or to a plurality of this distance if a plurality of contact points or a plurality of holes or cuts following each other in the direction of advancement of sheet 1 is made simultaneously by machine 4 or punching press 5 respectively.

In the arrangement illustrated in FIG. 1 the punching press 3, the machine 4 and the punching press 5 are driven independently of each other. The punching presses 3 and 5 and machine 4 are operated generally at different speeds during working. For that reason the speed control stations 61 and 62 are provided. Speed control station 61 starts the drive of punching press 3 when the continuous metal sheet 1 is at a level indicated in dotted lines just below control contact 63 and its stops the drive of punching press 3 when the continuous metal sheet 1 has sagged to a level below control contact 64 and forming the loop in solid lines in the drawing. The control station 62 is actuated in the same manner and is provided in the control contacts 65 and 66. The control contacts may be controlled either photoelectrically or by means of control arms. On the other hand the punching presses 3 and 5 and the machine 4 may be driven together in such a manner that each works a portion of the continuous metal sheet 1 of equal length during the same peroid of time. In such an arrangement to control stations 62 and 61 could be eliminated.

When it is desire to produce contact blades which have at least one bend it is possible to provide for such a working at least one such bent portion on the metal sheet befor the contact pieces are welded to the sheet. In that case guide members which are at least partly adapted to this bent portion of the metal sheet engaged it at this portion so as to adjust the sheet and to hold it during the welding and cutting operations, at a predetermined position of the bent portions relative to the welding and cutting devices. This embodiment of the process and apparatus is also suitable for manufacturing contact blades which consist of a bent wire having a contact piece welded thereto. In the case of contact blades having a bent part of spring sheet metal, a preliminary punching operation may be suitable or even necessary before the bending operation is carried out.

The means for feeding the strip of sheet metal through the punch press 1 are of a known type, for example a pair of opposed rollers 50 and 52, shown in FIG. 1 of the drawing as mounted on punch press 3. The rollers clamp the strip of sheet metal between them and a rotation of the rollers in opposite directions will feed the strip therethrough. Furthermore, as mentioned above, the sheet of strip metal is advanced and adjusted at the welding machine by the action of the guide means or pin whch engages the pilot holes and by the second base and clamping jaw which after termination of the welding operation, move the strip to the right as seen in FIG. 1 of the drawing, to thereby advance the sheet metal strip a predetermined distance placing it in the proper position for commencing a successive welding operation and to initiate the stamping of the contact point just welded. Corresponding guide means and clamping means are associated with the second punching press as described above.

What is claimed is:

1. The process of making contact blades which consists in feeding a strip of suitable metal through a first press, punching two spaced adjacent rows of successive holes near one edge of the strip the holes of each row being non-circular and of the same shape, but of different shape from the holes in the other row and one row of successive holes of at least two different shapes arranged alternately near the other edge of said strip the holes forming part of the outline of the blades and not part of any scrap section subsequently discarded, feeding said strip into a machine disposed adjacent said first press, locating said strip in said machine by inserting matching shape guide means into at least one of said holes punched in said strip for fixing the position of said strip both longitudinally and transversely, welding a quantity of contact material to said strip at predetermined points, stamping the contact material welded to said strip to provide a uniformly shaped contact member, feeding said strip through a second press mounted adjacent said machine, punching additional portions transversely from said strip in said second press to form along with the periphery of said successive holes the outline of a substantially finished contact blade, and severing said blade from the remaining portion of said strip.

2. The process of making contact blades which consists in feeding a strip of suitable metal through a first press, punching two spaced adjacent rows of successive holes near one edge of the strip the holes of each row being non-circular and of the same shape but of different shape from the holes in the other row, and one row of successive holes of at least two different shapes arranged alternately near the other edge of said strip, the holes of the row nearest said one edge having a trapezium shape and the holes of the inner row near said one edge having substantially an ellipse shape, one of said shapes of said holes of said row at said other edge being substantially rectangular, the holes forming part of the outline of the blades and not part of any scrap section subsequently discarded, feeding said strip into a machine disposed adjacent said first press, locating said strip in said machine by inserting matching shape guide means into at least one of said holes punched in said strip for fixing the position of said strip both longitudinally and transversely, welding a quantity of contact material to said strip at predetermined points, stamping the contact material welded to said strip to provide a uniformly shaped contact member, feeding said strip through a second press mounted adjacent said machine, punching an additional portion from said strip extending transversely from the inner edge of said rectangular hole, cutting each edge portion of said strip along the outer edge of said holes nearest each edge of said strip to form the outline of a substantially finished contact blade, and severing a remaining web portion between said ellipse-shaped holes to separate said blade from said strip.

References Cited by the Examiner

UNITED STATES PATENTS

| | | | |
|---|---|---|---|
| 2,252,899 | 8/1941 | Reynolds | 29—155.55 |
| 2,339,884 | 1/1944 | Schlumpf | 29—33.13 |
| 2,458,538 | 11/1949 | Sarka | 83—33 |
| 2,537,540 | 1/1951 | Messenger | 83—33 |
| 2,545,352 | 3/1951 | Gibbs | 29—155.55 |
| 2,650,415 | 9/1953 | Kingman | 29—33.13 |
| 2,689,894 | 9/1954 | Wikstron et al. | 200—166.1 X |
| 2,793,273 | 5/1957 | Underwood et al. | 200—166 |
| 2,812,406 | 11/1957 | Egan | 200—166 |
| 2,857,966 | 10/1958 | Socke | 83—33 |
| 2,932,880 | 4/1960 | Gellatly et al. | 29—155.55 |

FOREIGN PATENTS

| | | |
|---|---|---|
| 627,570 | 2/1946 | Great Britain. |
| 123,437 | 11/1948 | Sweden. |
| 144,577 | 3/1954 | Sweden. |

WHITMORE A. WILTZ, *Primary Examiner.*

BERNARD A. GILHEANY, JOHN F. CAMPBELL, *Examiners.*

H. O. JONES, R. W. CHURCH, *Assistant Examiners.*